J. P. SMITH.
Corn Sheller.
No. 16,127.
Patented Nov. 25, 1856.
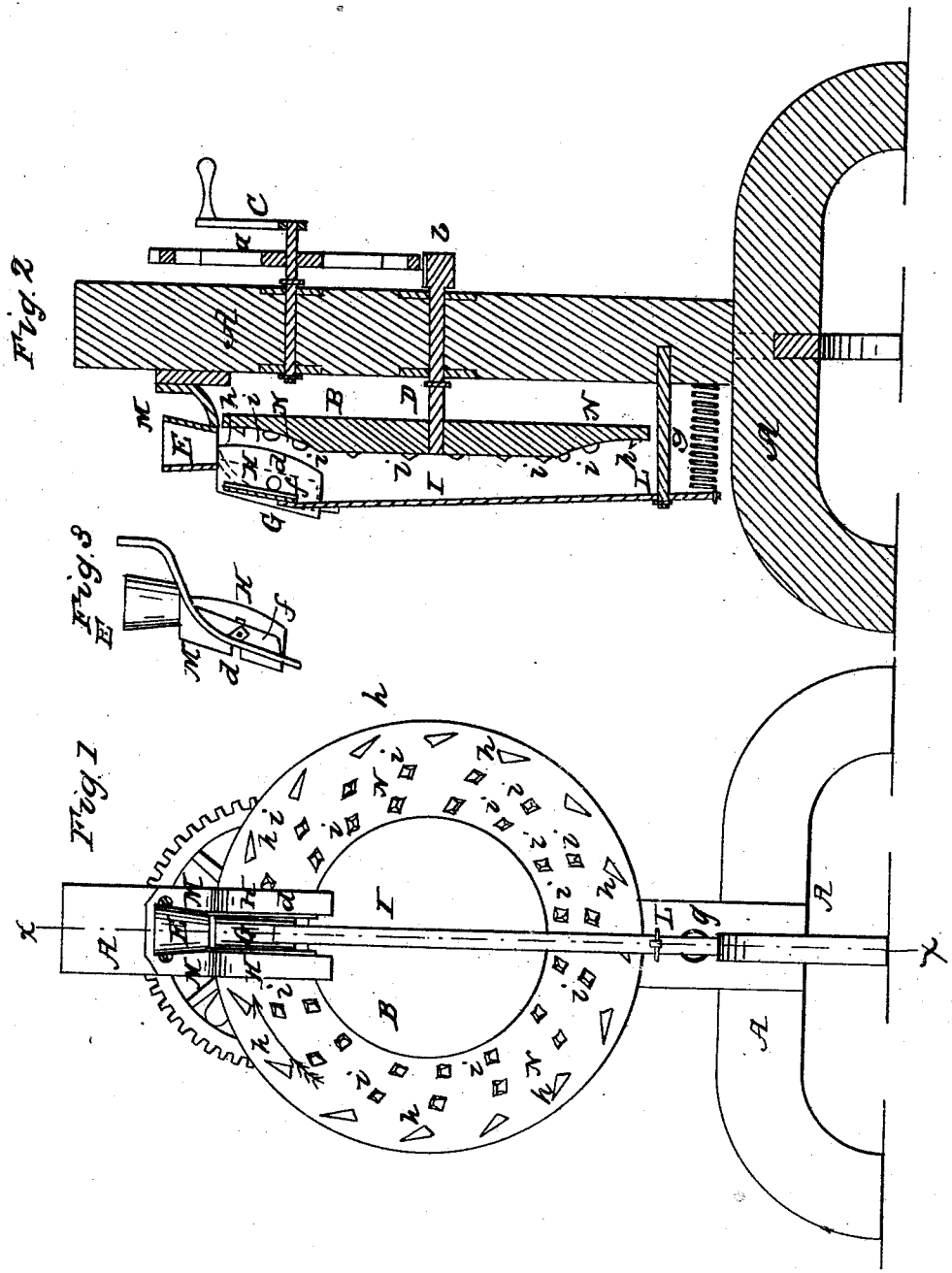

UNITED STATES PATENT OFFICE.

JEREMIAH P. SMITH, OF HUMMELSTOWN, PENNSYLVANIA.

DISK FOR SHELLING CORN.

Specification of Letters Patent No. 16,127, dated November 25, 1856.

*To all whom it may concern:*

Be it known that I, JEREMIAH P. SMITH, of Hummelstown, in the county of Dauphin and State of Pennsylvania, have invented a new and Improved Corn-Sheller; and I do hereby declare that the following is a full and exact description thereof, reference being had to the accompanying drawings, making part of this specification, Figure 1 being a front elevation of the corn-sheller; Fig. 2, a vertical section thereof in the plane *x x*, Fig. 1; Fig. 3, a view of a portion detached.

Like letters designate corresponding parts in all the figures.

The shelling wheel, or disk, B, is mounted on a horizontal shaft D, which passes through a suitable stand A, and is caused to revolve by means of a winch C, and the cog-wheel and pinion *a, b*. The peripheral portion of the face of the shelling disk, is hollowed substantially as shown at N, in Fig. 2, so as to form an annular concavity therein. Upon the surface of this concavity, the shelling teeth *i, i*, are arranged; and near the periphery of the wheel is a single annular row of teeth *h, h*, the edges of which are situated obliquely to the corresponding tangents of the disk; all in one direction, so as to have the effect of drawing down the ears of corn to the work, when the disk revolves in the direction indicated by the arrow in Fig. 1.

The ears are fed, one by one, to the shelling disk, through a short tube, or funnel, E, secured by an arm M, which projects from the stand A, in the proper position to direct the ears against the concavity N, of said shelling disk. The ears are held against the disk by two plates H, H, at the sides, and a plate G, in front. The two plates H, H, have their inner edges nearly or exactly of the same shape, as the profile of the concavity N; and parallel therewith. They are respectively provided with slots *d, d*, through which screw bolts *f, f*, pass, and thereby secure the plates to flanches on the projecting arm M. These slots enable the inner edges of the plates to be adjusted to suit different varieties of corn, for the space between the edges of the plates and the surface of the concavity N, should be only just sufficient to allow the grains of corn to pass out freely.

The plate G, is made to press with an elastic force toward the shelling disk, by being mounted on the upper end of a rod I, which is pivoted on a fulcrum L, and has a spring *g*, at its lower end, pressing outward and consequently pressing the upper end, with the plate G, inward. The plate is allowed to press inward sufficiently far to hold the smallest ears to the shelling disk; and is there stopped by the heads of the bolts *f, f*. The surface of the plate is situated in a direction nearly parallel with the concavity N. By employing the concave surface N, in connection with the other parts, as above described, the ears are infallibly shelled to the very tip; since said concavity brings the taper of the ear in contact with the shelling surface. Thus is accomplished what corn shellers generally fail to effect.

What I claim as my invention and desire to secure by Letters Patent, is—

The annular, concave shelling surface N, on the face of the shelling disk, when employed in combination with the other parts of the machine, substantially in the manner and for the purpose herein described.

The above specification signed by me this sixth day of October, 1856.

JEREMIAH P. SMITH.

In presence of—
DAVID DIFEND,
JESSE B. HUMMEL.